(12) United States Patent
Dubé et al.

(10) Patent No.: US 7,810,156 B2
(45) Date of Patent: Oct. 5, 2010

(54) AUTOMATED EVIDENCE GATHERING

(75) Inventors: Jean-François Dubé, Santa Clara, CA (US); William W. Wong, San Bruno, CA (US)

(73) Assignee: Agiliance Inc., San Jose, CA (US)

( * ) Notice: Subject to any disclaimer, the term of this patent is extended or adjusted under 35 U.S.C. 154(b) by 1115 days.

(21) Appl. No.: 11/407,843

(22) Filed: Apr. 20, 2006

(65) Prior Publication Data

US 2007/0250699 A1 Oct. 25, 2007

(51) Int. Cl.
*G06F 11/32* (2006.01)
*G06F 11/34* (2006.01)
*G06F 12/14* (2006.01)
*G08B 23/00* (2006.01)

(52) U.S. Cl. .............................. 726/22; 726/1; 726/23; 726/25; 714/45; 714/47

(58) Field of Classification Search .................. 726/22, 726/23, 25, 1; 714/45, 47
See application file for complete search history.

(56) References Cited

U.S. PATENT DOCUMENTS

| | | | | |
|---|---|---|---|---|
| 5,475,843 A | * | 12/1995 | Halviatti et al. | 717/124 |
| 6,449,739 B1 | * | 9/2002 | Landan | 714/47 |
| 6,535,912 B1 | * | 3/2003 | Anupam et al. | 709/217 |
| 7,315,826 B1 | * | 1/2008 | Guheen et al. | 705/7 |
| 2002/0032725 A1 | * | 3/2002 | Araujo et al. | 709/203 |
| 2003/0053717 A1 | * | 3/2003 | Akhan et al. | 382/302 |
| 2004/0027373 A1 | * | 2/2004 | Jacquot et al. | 345/730 |
| 2004/0255270 A1 | * | 12/2004 | McGlinchey et al. | 717/109 |
| 2005/0210056 A1 | * | 9/2005 | Pomerantz et al. | 707/101 |
| 2005/0257267 A1 | * | 11/2005 | Williams et al. | 726/25 |
| 2005/0278728 A1 | * | 12/2005 | Klementiev | 719/328 |
| 2006/0085852 A1 | * | 4/2006 | Sima | 726/22 |
| 2006/0136191 A1 | * | 6/2006 | Irons | 703/24 |

OTHER PUBLICATIONS

Gerrard, Paul. "Testing GUI Applications". EuroSTAR '97, Nov. 24-28, 1997, Edinburgh UK, <http://www.gerrardconsulting.com/GUI/TestGui.html>.*

* cited by examiner

*Primary Examiner*—Michael J Simitoski
(74) *Attorney, Agent, or Firm*—Ash Tankha, IP Legal Services (57) ABSTRACT

Evidence gathering and analysis from networked machines can be automated and made policy-based. In one embodiment, the present invention includes, a networked machine receiving an instruction from a server to execute a pre-recorded action sequence designed to capture evidence data. The machine can annotate the captured evidence data with meta-data, and send the annotated evidence data to the server. The server can then perform analysis on the collected evidence data and present the evidence data and the analysis to an administrator.

12 Claims, 7 Drawing Sheets

AUTOMATED EVIDENCE GATHERING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention apply to the field of network security and regulatory compliance, more specifically compliance management.

2. Description of the Related Art

Modern business enterprises operate in a complex regulatory environment. Many enterprises must comply with various government regulations both on the federal level and on the state and local levels. For example, most public corporations (at the present time any publicly traded corporation with fifty million or more market capitalization) must comply with the Sarbanes-Oxley Act of 2002. Financial enterprises, heath related enterprises, and other more stringently regulated industries have their own regulatory frameworks.

Furthermore, many business enterprises have internal policies and controls independent of government regulation. These controls and policies may be concerned with security, confidentiality maintenance, trade secret protection, access control, best practices, accounting standards, business process policies, and other such internal rules and controls. The cost of complying with all regulations, rules, policies, and other requirements can be substantial for a large scale business enterprise.

One common problem faced by business enterprises in the control/policy/regulation compliance area is evidence gathering. Auditors often require some form of proof that a given control is implemented, a policy is in compliance, and a regulation is being observed. Furthermore, a compliance management system should be able to monitor compliance. Some information however, is not readily accessible by usual networking methods. What is needed is a method and apparatus for automating some parts of the evidence gathering task.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Compliance Management System

Figure 1:
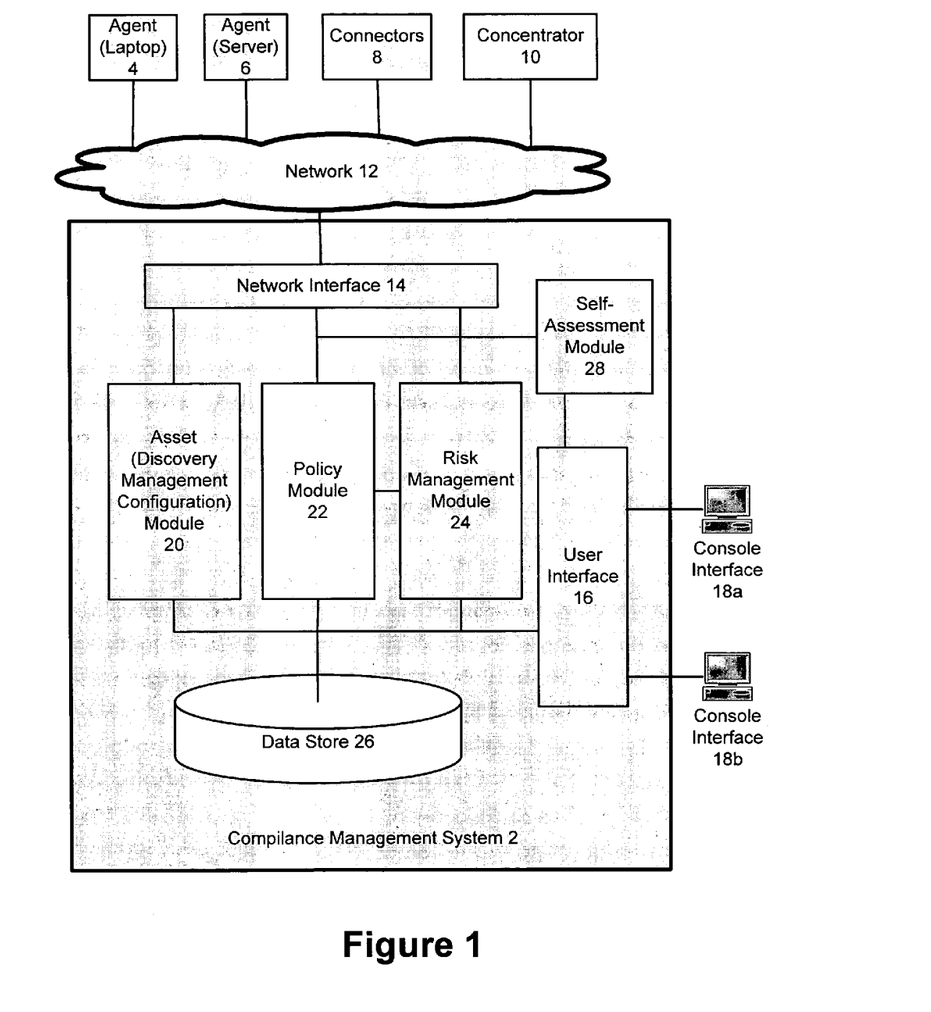
FIG. 1 is a block diagram illustrating a compliance management system according to one embodiment of the present invention.

One embodiment of the invention is now described with reference to FIG. 1. FIG. 1 shows a compliance management system 2. In one embodiment, the compliance management system 2 is provided as a stand-alone appliance that connects to a network, but the compliance management system 2 can be provided in other ways, such as software running on a server, distributed software, or various software and hardware packages operating together.

The compliance management system 2 connects to a network 12—such as a local area network (LAN), Intranet network segment, or the Internet—and can collect data from various sources. For example, the compliance management system 2 can collect data from agents 4 and 6. Agent 4 is an agent associated with and overseeing a laptop (in this example) and agent 6 is associated with a server. In a real-world embodiment, there could be thousands of agents associated with thousands of separate assets.

The compliance management system 2 can also collect information from various collectors 8. Collectors 8 can be custom designed connectors to connect to various network devices and network management and security products already installed by the enterprise. For example, the connectors 8 can enable the compliance management system 2 to connect to, and collect data from, routers, firewalls, directories (such as Microsoft's Active Directory), vulnerability scanners, security information management (SIM) products, enterprise risk management (ERM) products and other such products and applications. Also, some deployments of the compliance management system 2 may not use distributed agents at all, in which case information regarding various assets can be collected via an agent-less concentrator (also referred to sometimes as an aggregator) 10.

In one embodiment, the compliance management system 2 implements asset discovery, configuration, and management functionalities. Such functionality can be provided in the asset module 20 shown in FIG. 1. In one embodiment, the asset module interfaces with the various agents, connectors, and concentrators 2-10 (referred to collectively as "software interfaces" or "distributed software interfaces" for simplicity) via the network interface 14 that connects the compliance management system 2 to the network 12. The asset module 20 performs asset discovery by collecting information about all assets connected to and/or visible to the network 12. Such assets can include, but are not limited to, laptops, desktops, workstations, operating systems and other applications, servers, users, routers, intrusions detection devices (IDS), firewalls, printers, and storage systems. Assets can be imported from various connected applications, such as vulnerability scanners, directory applications, ERM, SIM, and other security-related products, and so on.

In one embodiment, the asset module 20 can also be used to configure asset attributes. This can be done by an operator of the compliance management system 2 via the user interface 16 exposed to the user by consoles 18a and 18b. There may be more or less consoles, which will be collectively referred to as console interface 18.

For example, an agent can report a newly discovered laptop computer. The agent can automatically report back on available attributes, such as central processing unity (CPU) type, the operating system running on the laptop, the types of memory installed, and so on. A user (typically a system administrator) can then add extra attributes to the laptop, such as business owner, business classification, group, and other similar attributes.

The discovered and configured assets can be stored, in one embodiment, in data store 26. Data store 26 can be implemented as a disk, a data server, or some other physical storage means. It can reside inside or outside of the compliance management system 2. The data store 26 can include various databases. One such database can be an asset database, having records corresponding with managed assets. The assets discovered and stored in the asset database can be managed, in one embodiment, from the console interface 18 by editing various attributes of the assets.

In one embodiment, policy compliance functionality is provided by the system 2 by implementing a policy module 22. The policy module 22 can enable a user—via the user interface 16—to author and edit policies and policy templates and apply policies to various assets. The policy module 22 also maintains a policy database in the data store 22. In one embodiment, policies can also be labeled, grouped and organized according to certain predefined roles for personnel. For example, "engineer level 1" can be a role that has a list of specific policies associated with it.

In one embodiment, the compliance management system 2 also provides risk management functionality by implementing a risk management module 24. The risk assessment module 24 analyzes multiple sources of information, including the compliance management system 2, to determine the risk the enterprise is exposed to. In one embodiment, the risk management module collects information—in addition to the compliance management system—from the enterprise's vulnerability assessment systems, SIM systems, asset configurations, and network traffic reports. Other sources of information may be used as well. In one embodiment, the risk management module determines a simple metric to express the enterprise's risk profile using all the collected information.

Figure 2:
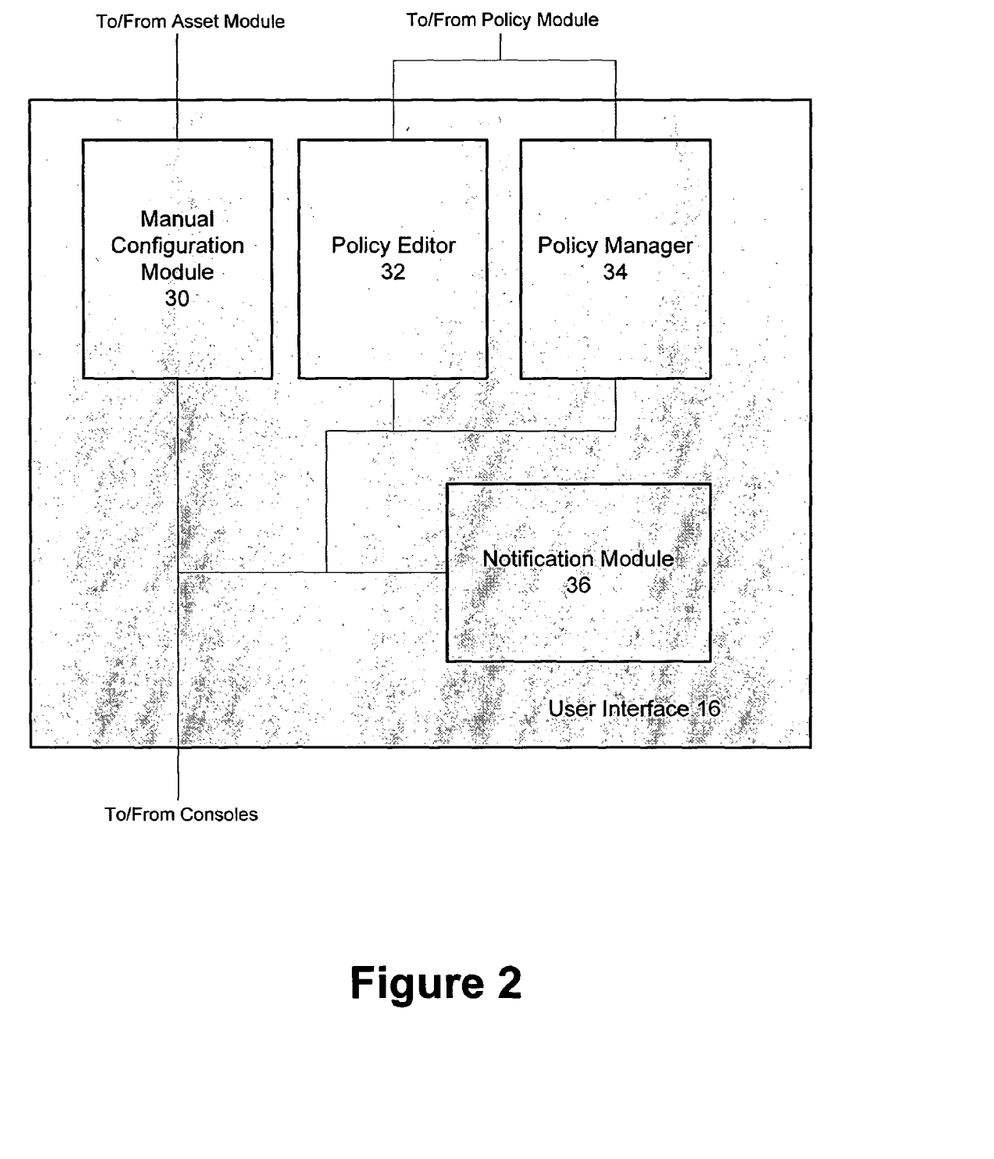
FIG. 2 is a block diagram illustrating a user interface module for a compliance management system according to one embodiment of the present invention.

As mentioned above, the compliance management system 2 also includes a user interface 16 which is exposed to users of the system 2 by consoles 18. In one embodiment the consoles 18 are browser-based, allowing for administration and use of the system 2 from any network-attached work station, or through a remote network connection. In one embodiment, the user interface enables an administrator to select from a list of regulations—such as Sarbanes-Oxley (SOX), Gramm-Leach-Bliley Act (GLBA), Health Insurance Portability and Accountability Act (HIPPA), Card Holder Information Regulation Program (CISP)—and display functionality relevant to the selected regulation. Similarly, the user interface can enable an administrator to select from a list of standard frameworks—such as ISO-17799, Control Objectives for Information and related Technologies (COBIT)—and display functionality relevant to the selected regulation or framework. FIG. 2 provides a more detailed view of the user interface 16 according to one embodiment of the present invention.

The user interface 16 can implement a manual configuration module 30 that allows the user to manually configure asset attributes, as described in the example of the laptop being assigned to a business owner (and other user-defined attributes) above. The user interface can also implement a policy editor 32. The policy editor 32 can assist users in naming and authoring policies.

The policy editor 32 can also provide access to a policy template database stored on the data store 26 having template policies. A user can then create a specific policy instance using a preconfigured template by saving the policy instance as a policy. The policy editor 32, in one embodiment, also includes access to a script-based policy language that allows for highly flexible authoring of almost any type of desired policy. In addition, the policy editor 32 can be used to edit saved policies and policies from various preconfigured policy databases as well as author and edit policy templates.

In one embodiment, the policies that can be authored by the policy editor 32 are highly flexible. Such policies include technology-based policies, such as password length and firewall configurations. Furthermore, some policies can be process related, ensuring that certain process owners take certain actions. Yet other types of polices can include some that cannot be automatically enforced in an information technology sense. For example, risk assessment surveys must be manually filled out by someone responsible for the domain being surveyed, and a policy can include the requiring of such a survey being filled out periodically. Since such policies require at least some human interaction, they are sometimes referred to herein as "manual" policies.

The user interface 16 can also implement a policy manager 34. The policy manager 34 allows the user to organize and apply policies. Policies can be associated with controls that are designed to mitigate against specific threats, as defined in various standards, such as ISO-17799. In one embodiment, the policy manager can be used to identify threats, define (or import) controls, and associate policies to controls to implement the controls. One control may be implemented using several policies, and a policy may be occasionally used in multiple controls. In one embodiment, policies are applied directly to assets or groups of assets. The user interface 16 can also include a notification module 36 to send alerts and reports regarding compliance management and risk analysis.

Returning to referencing FIG. 1, the compliance management system 2 can also include a self-assessment module 28. The self-assessment module 28 maintains and accesses various self-assessment surveys that can be stored in data store 26. The self-assessment module 28 may periodically, or under the direction of the policy module 22 or the user interface 16, send surveys to various individuals for completion. The self-assessment module 28 can analyze the results of such surveys and provide feedback to various other parts of the system 2.

Evidence Gathering

Figure 3:
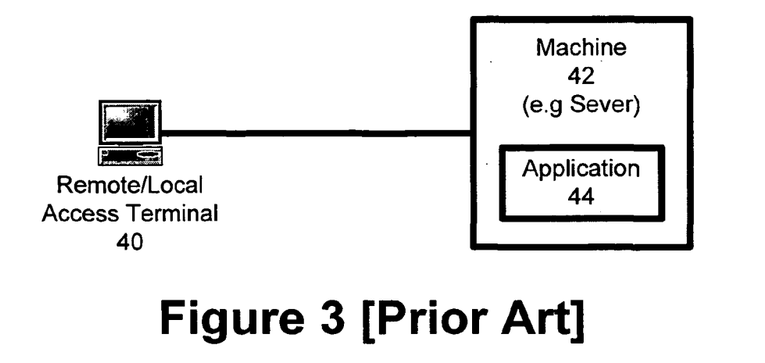
FIG. 3 is a block diagram illustrating prior art evidence gathering.

Prior art evidence gathering is now described with reference to FIG. 3. A person would access a machine 42 (for example a server) over a network using a remote or local access terminal 40. This person would then open the application 44 of interest, for example the Enterprise Security Manager (ESM) application. This person would record data from the application 44 and from charts displayed by, and reports created by the application 44. The recorded data can later serve as evidence that the target machine and application were following certain policies or controls. This person would repeat this for every application of interest on the machine 42, and for every such machine of interest on the network. With potentially tens of thousands of machines on an enterprise network, this can be, and indeed in some corporations is, a full-time job.

Figure 4:
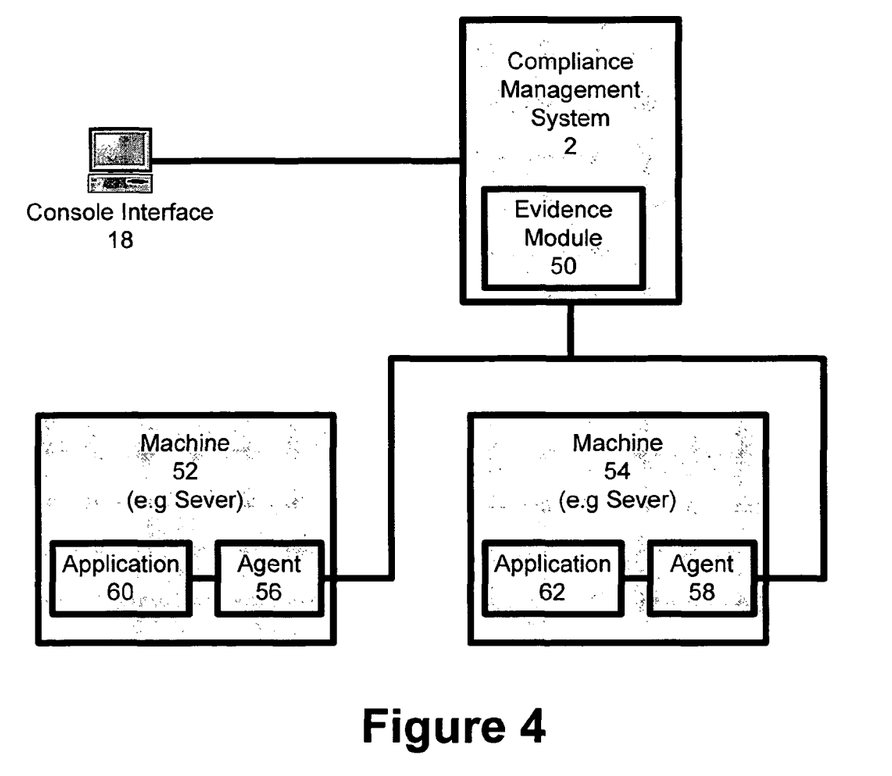
FIG. 4 is a block diagram illustrating evidence gathering according to one embodiment of the present invention.

One embodiment of the present invention is now described with reference to FIG. 4. Using the console interface 18 the administrator can set up an evidence module 50 to automate evidence gathering. In FIG. 4, the evidence module 50 is shown collecting evidence from two machines (52, 54), but in a real-world deployment, the evidence module could collect evidence from many more—potentially thousands of—machines.

In one embodiment, evidence module 50 can direct agents (56, 58) resident on the monitored machines (52, 54) to perform evidence gathering by opening and navigating applications (60, 62) running on these machines. An agent 56 can be a specialized agent, or a standard embedded agent, such as the Windows remote desktop agent. In one embodiment, the evidence module 50 can use existing remote applications, such as Windows Remote Desktop, to get the evidence data. One embodiment of evidence gathering using the system of FIG. 4 is described with reference to FIG. 7 further below. First, however, one embodiment of an administrator setting up the evidence module 50 is now described with reference to FIG. 5 and FIG. 6.

Figure 5:
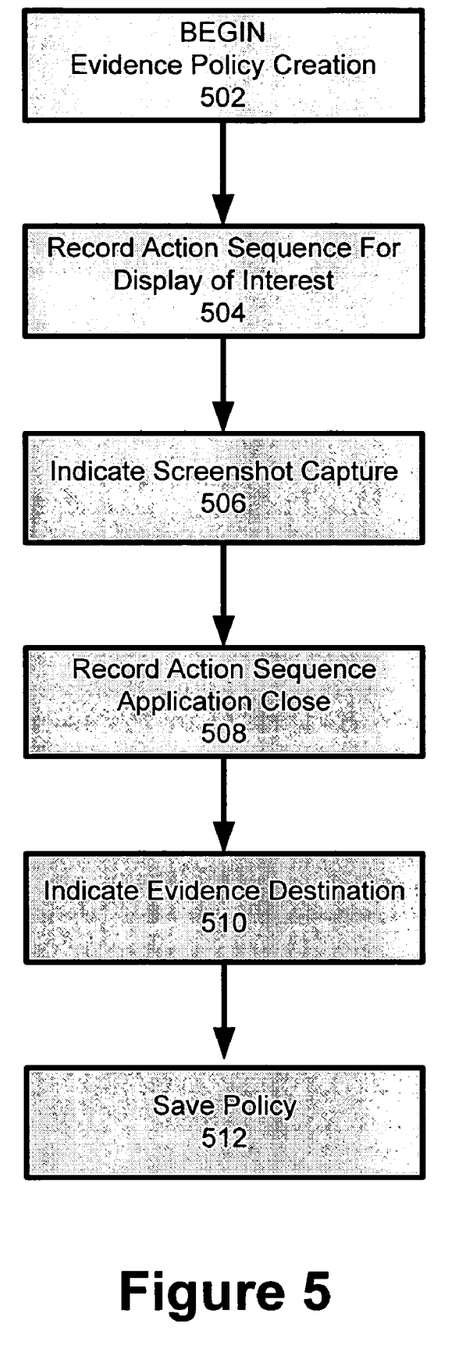
FIG. 5 is a flow diagram illustrating evidence policy creation according to one embodiment of the present invention.
Figure 6:
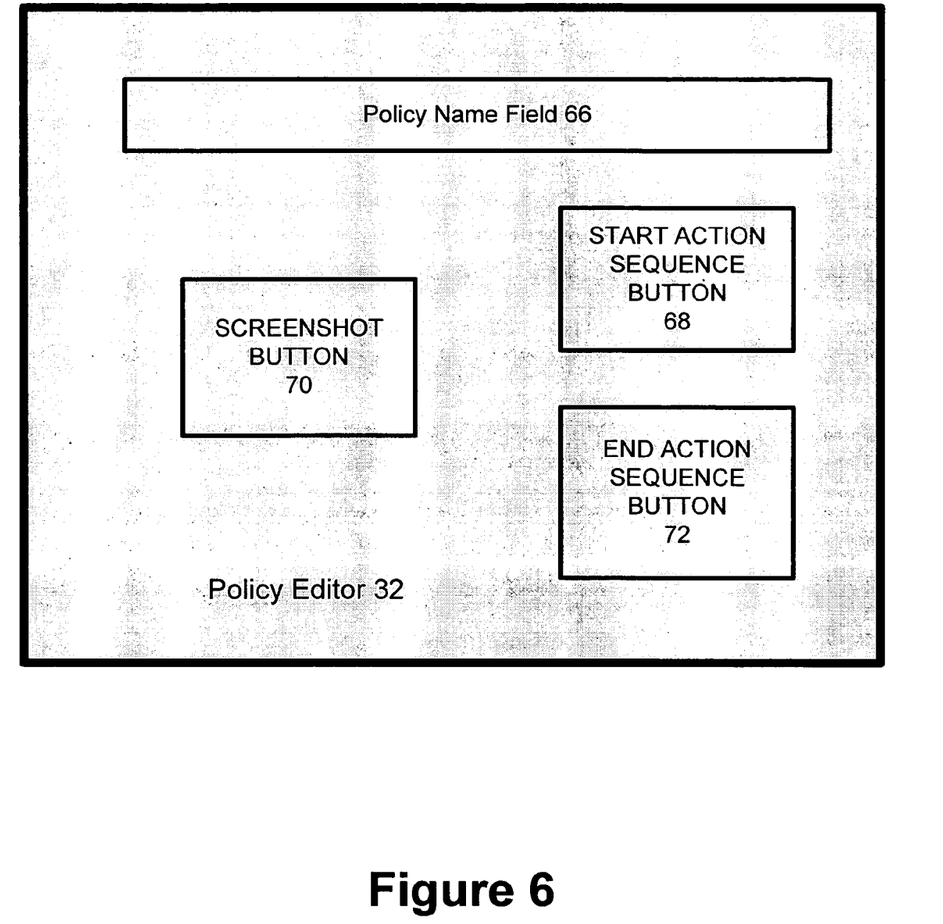
FIG. 6 is a block diagram illustrating an evidence policy editor according to one embodiment of the present invention.

In one embodiment, setting up the evidence module includes creating an evidence gathering policy, in block 502. A simplified policy editor 32 frame that can be used to create such an evidence policy is shown in FIG. 6. In block 504, the creator of the policy records an action sequence designed to bring up a display of interest. Such action sequence can be recorded using keystroke and mouse capture mechanisms. The action sequence can include opening a target application (e.g., the ESM application), navigating to a target display, and creating reports and graphs representing desired information about a target machine. Referring to FIG. 6, a user can press the "start action sequence" button 68 to capture the action sequence in block 504.

In block 506, the policy creator indicates a screenshot capture. This can be captured by keystroke capture, or by using the "screenshot" button 70 shown in FIG. 6. This can be done when the administrator (policy creator) is satisfied that the display of the application or the computer is indicative as evidence of its current state or other desired information. In one embodiment, the administrator can select the area of the snapshot that is of interest or mark areas that are not relevant and should be ignored in subsequent screenshot analysis. The screenshot can be of the whole screen, an individual window or multiple windows from one or multiple applications, the operating system, or any other graphical limitation.

In one embodiment, the administrator can continue navigating to different areas of the target application, open additional applications, and capturing additional screenshots, essentially repeating blocks 504 and 506. In block 508, an action sequence to close target application and restore the original state of the target machine is recorded. In one embodiment, the policy creator can indicate the end of the action sequence recording by pushing the "end action sequence" button 72.

The evidence policy can be given a name, e.g., using the "policy name" field 66, under which it can be saved in the policy database, searched and retrieved. Other policy attributes can be assigned as well. For example, in block 510, an evidence destination (such as a dedicated folder or table) can be indicated. When the policy is completely created by the administrator, it is saved in block 512.

The policy editor interface 32 shown in FIG. 6 is only an illustrative example. For example, the start action sequence button 68 and the end action sequence button 72 can be implemented using a single start/stop button. In another embodiment, a standard recording/playback interface (such as those found on VHS and DVD recorders) can be provided.

One embodiment of evidence policy execution is described with reference to FIG. 7. In block 702, the compliance management system 2 begins execution of the policy by instructing an agent on a target machine to begin. In block 704, the agent receives the instruction. The instruction may contain the evidence policy (including the action sequence) to be executed by the agent, or the agent may already have the policy cached.

In block 706, the action sequence begins to be executed by the agent, resulting in the opening and manipulation of the target application, and the creating of the desired views and reports. In another embodiment, the action sequence is executed by the system 2 in block 706, and the target machine is remotely controlled to carry out the sequence. The desired views can include configuration, status, statistics, reports or any other digital or visual data.

Once a desired view is reached, in block 708, a screenshot is recorded, as indicated by the action sequence. A single action sequence can included multiple screenshots, as explained above. Execution of the action sequence continues in block 710 with the restoration of the machine's original state.

In block 712, the one or more screenshots are annotated with meta-data. Such meta-data can include the name (and/or IP address) of the target machine, the target application, the agent name, the time of the screenshot, the title of the window, the user account used, the areas of interest in the screenshot, and the areas to ignore. For example, some areas of the screen, such as a clock, show changing information that is not of interest. Then, in one embodiment, the annotated one or more screenshots are delivered to the compliance management system. The compliance management system can store the resulting evidence screenshots according to the evidence destination indicated in the policy.

Figure 7:
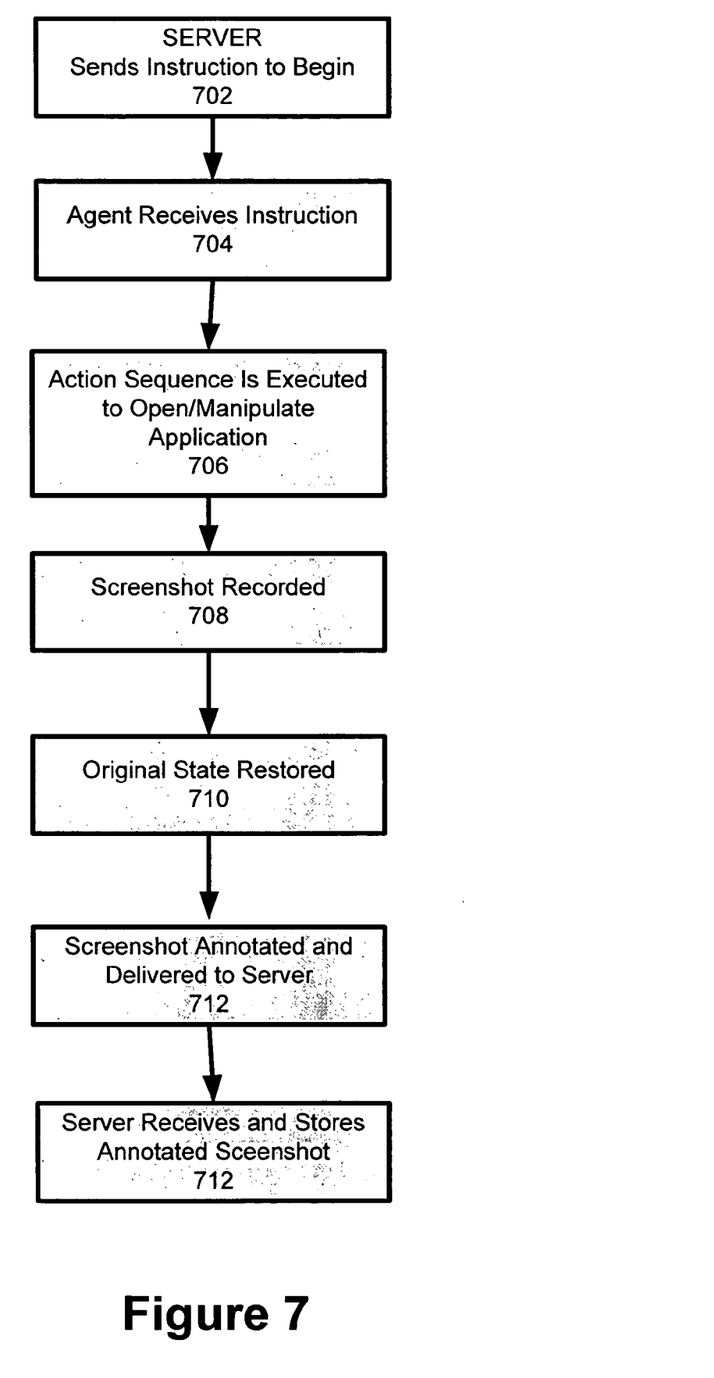
FIG. 7 is a flow diagram illustrating a evidence policy execution according to one embodiment of the present invention.

Since the policy execution described with reference to FIG. 7 is fully automated, various information of interest that was previously only accessible by manual access is now collected in an automated fashion. Furthermore, since once created, a policy can be repeatedly used to gather evidence from a large number of machines, effort and man-hours are greatly reduced.

Policy Monitoring

The evidence gathering feature described above need not be implemented in a policy-based framework, as described above. However, such implementation offers an advantage when additional features are added to the evidence gathering functionality, which can be associated with the evidence policy. For example, one such feature can be duplicate elimination.

When creating the policy, the administrator may specify that duplicate screenshots should be condensed and in what manner. For example, for identical screenshots,—screenshots containing the same relevant information—the administrator may only want to see one of the screenshots, and a log of the duplicate instances, or only the meta-data associated with the other instances. Screenshots can be cropped and defined to only contain relevant information.

Another such policy monitoring feature that can be implemented is red-flagging and baseline finding. For example, if a certain report is gathered from one thousand laptops, and the thousand report screenshots are 95 percent identical, then an inference can be made that most machines are configured correctly, and the remaining 5 percent represent the reports of interest. In this manner, normal configuration/state can be baselined, and outliers detected. This focuses the scarce time of the administrator to the machines of interest.

In one embodiment, by gathering and comparing the pieces of evidence or screenshots, the system can create groups of assets or machines that have the same configuration. When comparing pieces of evidence or screenshots, the algorithm can ignore pieces or the evidence or screenshots as instructed by the policy. In one embodiment, the policy can also include rules to align the data or images to help the algorithm compare them.

Example Computer System

Various embodiments of the present invention have been described in the context of a server that performs compliance, security, and risk management functionalities, and a browser/console interface operable to access and view those functionalities. An example computer system on which such server and/or console interface can be implemented in now described with reference to FIG. 8. Numerous features described with reference to FIG. 8 can be omitted, e.g., a server will generally not include video display unit 1810. Computer system 1800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

Figure 8:
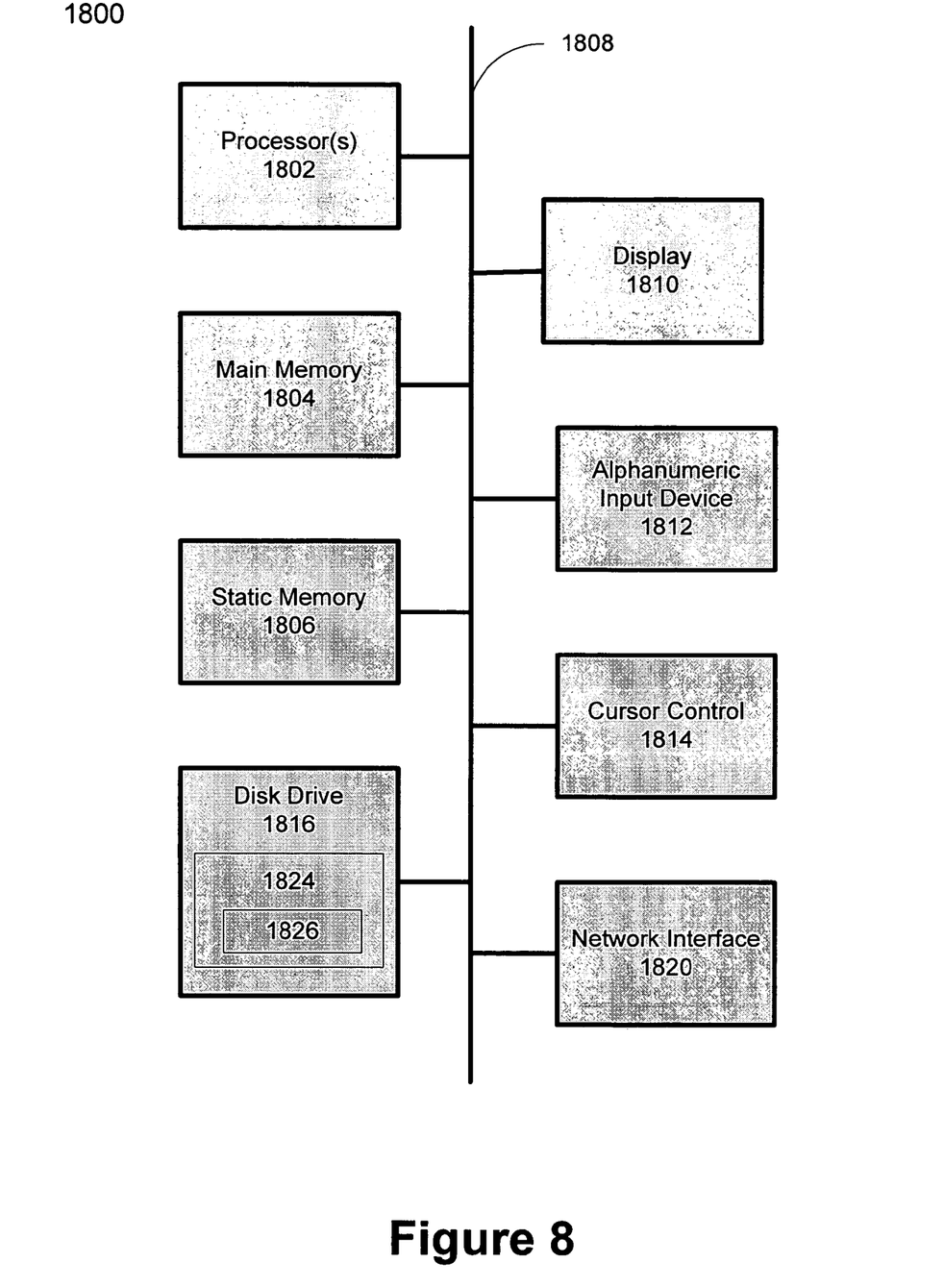
FIG. 8 is a block diagram illustrating an example computer system according to one embodiment of the present invention.

The computer system 1800 includes a processor 1802, a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alpha-numeric input device 1812 (e.g., a keyboard), a cursor control device 1814 (e.g., a mouse), a disk drive unit 1816, and a network interface device 1820.

The disk drive unit 1816 includes a machine-readable medium 1824 on which is stored a set of instructions (i.e., software) 1826 embodying any one, or all, of the methodologies described above. The software 1826 is also shown to reside, completely or at least partially, within the main memory 1804 and/or within the processor 1802. The software 1826 may further be transmitted or received via the network interface device 1822. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to include, but not be limited to, solid-state memories, optical and magnetic disks, and carrier wave signals.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method performed by a compliance management system comprising:
    instructing a plurality of machines to gather evidence data by selectively capturing screenshots of target views based on areas of interest and by annotating the gathered evidence data with meta-data;
    receiving the annotated evidence data from the plurality of machines;
    storing the received evidence data; and
    determining a baseline evidence data by counting the numbers of identical screenshots of the target views received from the plurality of the machines.

2. The method of claim 1, wherein instructing the plurality of machines comprises sending to each of the plurality of machines an action sequence to execute, the action sequence comprising a pre-recorded sequence of keystrokes, mouse-clicks, and screenshot captures.

3. The method of claim 2, wherein the instructing of the plurality of machines and the storing of the received evidence data is performed according to an evidence policy.

4. The method of claim 3, wherein the evidence policy comprises the action sequence and an indication of a location to store the received evidence data.

5. The method of claim 1, further comprising removing duplicate screenshots from the evidence data received from the plurality of machines.

6. The method of claim 5, further comprising retaining meta-data associated with removed duplicate screenshots.

7. A compliance management system comprising:
    a network interface to send an instruction to a plurality of machines to gather evidence data by capturing screenshots of target views based on areas of interest and annotating the gathered evidence data with meta-data, and to receive the annotated evidence data from the plurality of machines;
    a data store to store the received evidence data; and a processor to determine a location to store the received evidence data based on an evidence policy associated with the sending of the instruction, wherein the processor determines a baseline screenshot by counting the number of identical screenshots received from said machines and generates an alert by comparing the screenshots captured in the received evidence data with said baseline screenshot.

8. The compliance management system of claim 7, wherein the instruction comprises a pre-recorded action sequence of keystrokes, mouse-clicks, and screenshot captures.

9. The compliance management system of claim 7, wherein the processor removes duplicate screenshots from the evidence data received from the plurality of machines.

10. The compliance management system of claim 7, further comprising a user interface, said user interface comprising:
   a policy editor to create and edit an evidence policy used to collect evidence data from a remote machine, the policy editor comprising graphic controls to record of an action sequence of keystrokes, mouse-clicks, and screenshots.

11. The compliance management system of claim 10, wherein the graphic controls include a start action sequence button operable to begin the recording of the action sequence and an end action sequence button operable to finish the recording of the action sequence.

12. The compliance management system of claim 11, wherein the start action sequence button and end action sequence button comprise the same button.

* * * * *